(12) United States Patent
Zhou (10) Patent No.: US 11,386,893 B2
(45) Date of Patent: Jul. 12, 2022

(54) HUMAN-COMPUTER INTERACTION PROCESSING SYSTEM, METHOD, STORAGE MEDIUM, AND ELECTRONIC DEVICE

(71) Applicant: ALIBABA GROUP HOLDING LIMITED, Grand Cayman (KY)

(72) Inventor: Yao Zhou, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 231 days.

(21) Appl. No.: 16/601,262

(22) Filed: Oct. 14, 2019

(65) Prior Publication Data
US 2020/0118566 A1   Apr. 16, 2020

(30) Foreign Application Priority Data
Oct. 15, 2018   (CN) .......................... 201811194884.3

(51) Int. Cl.
*G10L 15/22*   (2006.01)
*G06F 9/48*   (2006.01)
*G10L 15/18*   (2013.01)

(52) U.S. Cl.
CPC ............ *G10L 15/22* (2013.01); *G06F 9/4806* (2013.01); *G10L 15/1822* (2013.01); *G10L 2015/223* (2013.01)

(58) Field of Classification Search
USPC ............................................... 704/7–10, 257
See application file for complete search history.

(56) References Cited

U.S. PATENT DOCUMENTS

| | | | |
|---|---|---|---|
| 8,572,209 B2 * | 10/2013 | Healey | G06F 8/00 709/219 |
| 9,292,254 B2 | 3/2016 | Simpson et al. | |
| 9,460,715 B2 | 10/2016 | Hart et al. | |
| 9,489,171 B2 | 11/2016 | Klein et al. | |
| 9,582,246 B2 | 2/2017 | Klein et al. | |
| 9,698,999 B2 | 7/2017 | Mutagi | |
| 10,048,748 B2 | 8/2018 | Sridharan et al. | |
| 10,424,302 B2 * | 9/2019 | Shah | G06F 16/90332 |
| 2003/0225825 A1 * | 12/2003 | Healey | G06F 8/00 709/203 |
| 2004/0083092 A1 | 4/2004 | Valles | |
| 2008/0034032 A1 * | 2/2008 | Healey | G06F 8/00 709/203 |
| 2010/0299136 A1 | 11/2010 | Tong et al. | |
| 2013/0297318 A1 | 11/2013 | Balasubramanyam et al. | |
| 2013/0346085 A1 | 12/2013 | Stekkelpak | |

(Continued)

OTHER PUBLICATIONS

Written Opinion and International Search Report for PCT Application No. PCT/US2019/056125 dated Dec. 31, 2019 (10 pages).

*Primary Examiner* — Leonard Saint Cyr (57) ABSTRACT

Embodiments of the specification provide a human-computer interaction processing system, method, storage medium, and electronic device thereof. The method comprises: describing an interaction task in an interaction scenario; performing interaction process control for a current interaction input in the interaction scenario based on the interaction task; and determining an expected next interaction input in the interaction scenario corresponding to the current interaction input based on the interaction process control.

21 Claims, 5 Drawing Sheets

(56) References Cited

U.S. PATENT DOCUMENTS

| | | |
|---|---|---|
| 2014/0012574 A1 | 1/2014 | Pasupalak et al. |
| 2014/0173440 A1 | 6/2014 | Dal Mutto et al. |
| 2014/0247216 A1 | 9/2014 | Fang |
| 2015/0142704 A1 | 5/2015 | London |
| 2015/0276254 A1 | 10/2015 | Nemcek et al. |
| 2016/0042735 A1* | 2/2016 | Vibbert ................ G10L 15/222 704/257 |
| 2016/0365101 A1 | 12/2016 | Foy et al. |
| 2017/0221484 A1 | 8/2017 | Poltorak |
| 2017/0249940 A1 | 8/2017 | Chen et al. |
| 2017/0316777 A1 | 11/2017 | Perez et al. |
| 2019/0115027 A1* | 4/2019 | Shah ....................... G10L 17/22 |

\* cited by examiner

ID# HUMAN-COMPUTER INTERACTION PROCESSING SYSTEM, METHOD, STORAGE MEDIUM, AND ELECTRONIC DEVICE

CROSS REFERENCE TO RELATED APPLICATION

The present application is based on and claims priority to Chinese Patent Application No. 201811194884.3, filed on Oct. 15, 2018, which is incorporated herein by reference in its entirety.

TECHNICAL FIELD

Embodiments of the present application relate to the field of human-computer interaction technologies, and in particular, to a human-computer interaction processing system, method, storage medium, and electronic device.

BACKGROUND

With the continuous development of voice recognition and natural language understanding technologies over recent years, intelligent interaction has been extensively used in various fields, such as chatbots, smart speakers, intelligent customer services, and the like.

Several common interaction management methods in the current technologies are listed below:

1. Key-phrase (keyword matching): capturing the last sentence of user input and performing interactive response according to a key phrase or key word therein. This solution is not flexible enough and not all interaction scenarios can be handled by only relying on the last sentence of user input and keywords thereof.

2. Finite-state machine (finite-state machine): using a finite-state machine to cover all interaction flows in an exhaustive manner. The defect of this solution is that it is difficult to process complex tasks, and a user is not allowed to switch topics.

3. Slot-filling (slot filling): parsing user input to obtain key information, i.e., the slot information, the interaction management keeps querying and collecting necessary slot information until conditions are satisfied for task execution. This solution is suitable for scenarios with a small amount of slot information and few task types, and the application scope is limited. It is impossible to process tasks with a high amount of slot information, such as consultation, shopping guide, and the like.

In summary, there is an urgent need for a technical solution to solve or mitigate the above problems of the current technologies.

SUMMARY

In light of the above, one of the technical problems to be solved by the embodiments of the present application is to provide a human-computer interaction processing system and a method, a storage medium, and an electronic device thereof for solving or mitigating the above technical defects of the current technologies.

The embodiments of the present application provide a human-computer interaction processing method, comprising: describing an interaction task in an interaction scenario; performing interaction process control for a current interaction input in the interaction scenario based on the interaction task; and determining an expected next interaction input in the interaction scenario corresponding to the current interaction input based on the interaction process control.

The embodiments of the present application also provide a human-computer interaction processing system comprising one or more processors and one or more non-transitory computer-readable storage media storing instructions executable by the one or more processors to cause the system to perform operations comprising: describing an interaction task in an interaction scenario; performing interaction process control for a current interaction input in the interaction scenario based on the interaction task; and determining an expected next interaction input in the interaction scenario corresponding to the current interaction input based on the interaction process control.

The embodiments of the present application also provide a storage medium, wherein the storage medium stores computer executable instructions, and when executed by a processor, the computer executable instructions implement the human-computer interaction processing method according to the embodiments of the present application.

The embodiments of the present application provide an electronic device, comprising a processor and a storage medium, wherein the storage medium stores computer executable instructions, and when executed by the processor, the computer executable instructions implement the human-computer interaction processing method according to the embodiments of the present application.

In the embodiments of the present application, as interaction tasks in different application scenarios can be described through the interaction transaction apparatus, complex dialogue flows may be customized. Furthermore, an interaction control unit may perform control on an interaction flow for a current interaction input according to the interaction task, so that the control of dialogue flows become more flexible and can satisfy various dialogue scenario demands. Moreover, an interaction organizing unit may determine expected next interaction input in an interaction scenario corresponding to the current interaction input according to the control on the interaction flow, thereby allowing the user to flexibly switch topics.

BRIEF DESCRIPTION OF THE DRAWINGS

Some specific examples of the embodiments of the present application will be described in detail below with reference to the accompanying drawings in an exemplary, rather than limiting, manner. Identical legends in the accompanying drawings represent identical or similar parts or components. These drawings are not necessarily plotted to scale. In the accompanying drawings.

DETAILED DESCRIPTION

The technical solutions in the embodiments of the present invention will be described below with reference to the accompanying drawings in the embodiments of the present invention. The described embodiments are merely some, but not all, embodiments of the present invention. Components in the embodiments of the present invention described and illustrated in the accompanying drawings may typically be arranged and designed in various configurations. Therefore, the detailed description of the embodiments of the present invention provided in the accompanying drawings is not intended to limit the protection scope of the present invention, but only represents selected embodiments of the present invention. Based on the embodiments of the present invention, all other embodiments obtainable by one of ordinary skill in the art without inventive effort shall fall within the scope of the present invention.

To enable one of ordinary skill in the art to better understand the technical solutions in the embodiments of the present application, the technical solutions of the present application will be described below with reference to the accompanying drawings in the embodiments of the present application.

Figure 1:
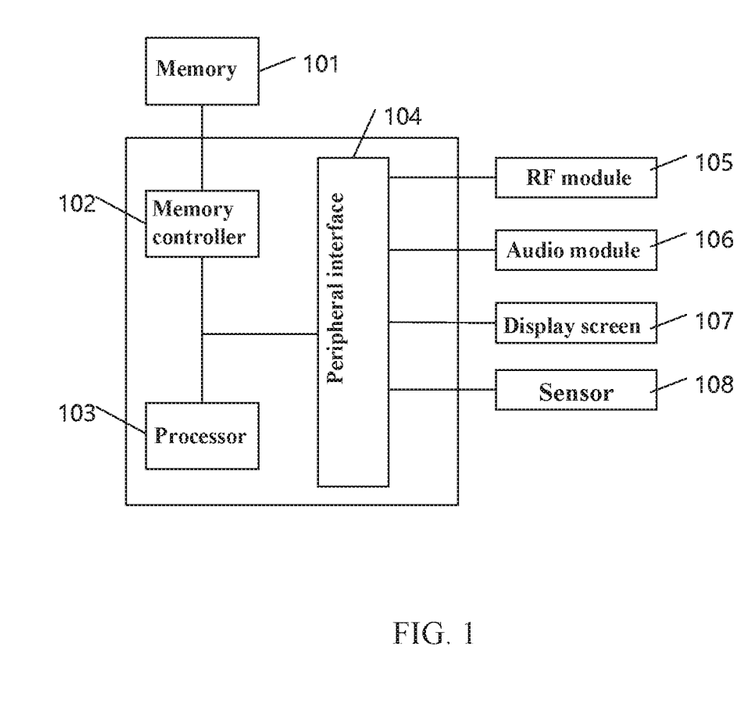
FIG. 1 illustrates an example schematic structural diagram of an electronic terminal according to some embodiments.

FIG. 1 illustrates an example schematic structural diagram of an electronic terminal according to some embodiments. The method and apparatus provided by the embodiments of the present invention may be implemented by the electronic terminal shown in FIG. 1.

In some embodiments, the electronic terminal shown in FIG. 1 may be a mobile terminal device, for example, a smart phone, a tablet computer, an e-book reader, an MP3 (MovingPictureExpertsGroupAudioLayerIII) player, a MP4 (MovingPictureExpertsGroupAudioLayerIV) player, a laptop computer, a wearable mobile terminal, and the like.

As shown in FIG. 1, the electronic terminal may include a memory 101 (or referred to as a storage medium), a memory controller 102, one or more (only one shown in the figure) processors 103, a peripheral interface 104, a radio-frequency (RF) module 105, an audio module 106, a display screen 107, and a sensor 108 such as an acceleration sensor, a distance sensor, and the like. These components may be in communication with one another via one or more communication buses/signal lines.

The memory 101 may be configured to store software programs and modules, such as program instructions/modules corresponding to the human-computer interaction method and apparatus in the embodiments of the specification, and the processor 103 may execute various functional applications and data processing by running the software programs and modules stored in the memory 101.

The memory 101 may include a high-speed random-access memory and may also include a non-volatile memory, such as one or more magnetic storage devices, flash memories, or other non-volatile solid-state memories. The access to the memory 101 by the processor 103 and other potential components may be performed under the control by the memory controller 102.

The peripheral interface 104 may be coupled with various input/output devices to the processor 103 and the memory 101. In some embodiments, the peripheral interface 104, the processor 103, and the memory controller 102 may be implemented in a single chip. In some other embodiments, they may be implemented separately by independent chips.

The RF module 105 may be configured to receive and transmit electromagnetic waves, achieve mutual conversion between electromagnetic waves and electric signals, and thus communicate with a communication network or other devices.

The audio module 106 may provide an audio interface to a user and may include one or more microphones, one or more loudspeakers, and an audio circuit.

The display screen 107 may simultaneously provide an output interface and an input interface between the electronic terminal and the user. For example, the display screen 107 displays a content output to the user, and the content output may include texts, images, videos, or any combination thereof.

The distance sensor in the sensor 108 may be configured to sense a distance between the electronic terminal and a human body. For example, during a dialogue, when the screen of the electronic terminal gets close to the face of the user, the distance sensor will automatically sense the distance between the electronic terminal and the face of the user. When the distance is smaller than a value, the screen will dim and no longer accept event such as user touching the screen, thereby preventing mis-operation during the dialogue. The distance sensor may be further configured to achieve controls such as suspension.

The acceleration sensor in the sensor 108 is a sensor capable of sensing acceleration and converting the same to a usable output signal.

The electronic terminal shown in FIG. 1 is merely illustrative. It may include more or fewer components than those shown in FIG. 1, or have a configuration different from what is shown in FIG. 1. The components shown in FIG. 1 may be implemented by hardware, software, or a combination thereof.

In the embodiments of the specification, a client may be installed in the electronic terminal shown in FIG. 1. The client may be a browser or a third-party application that corresponds to a server and provides services to a user, such as an electronic reading service for playing various local or online visualized text files.

In the embodiments of the specification, a display interface may include a display interface of the client in the electronic terminal, including an interface that may display contents and a progress label for displaying the browsing progress of the currently displayed content. The size of the display interface may be related to the settings of the display interface by the client. If the display interface is in a full-screen mode as set by the client, the size of the display interface may be the same as the size of the display region of a display screen of the electronic terminal (e.g., the display screen 107). If the display interface is set by the client to be smaller than the display screen of the electronic terminal, the size of the display interface may be the size of the display interface that is actually set.

Figure 2:
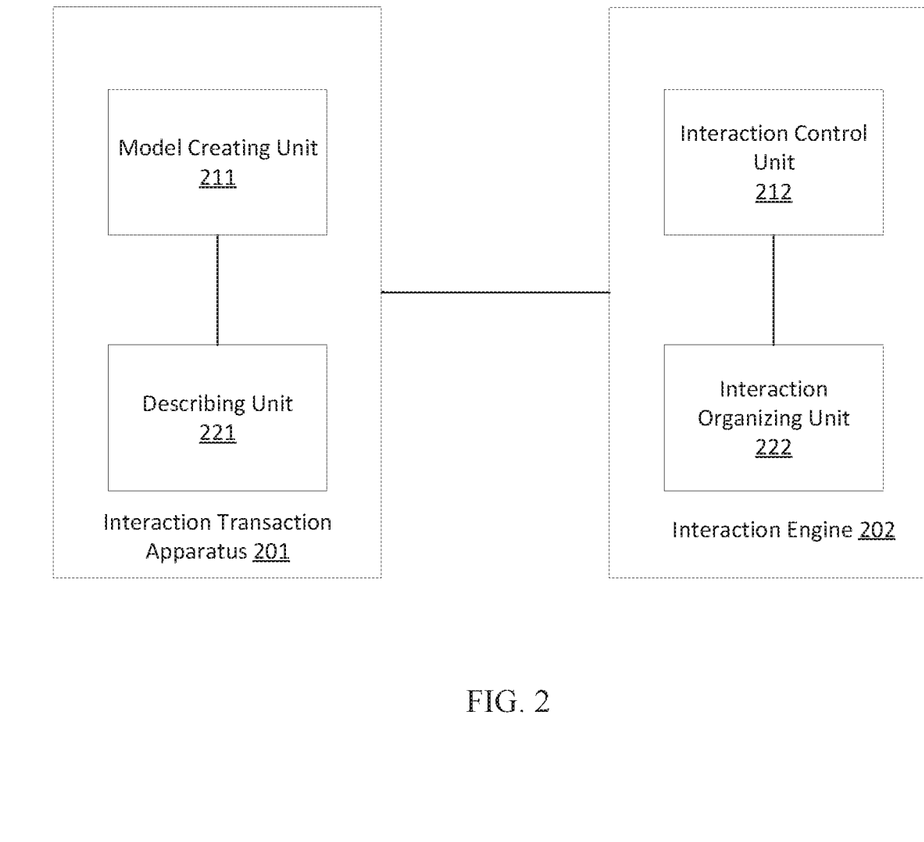
FIG. 2 illustrates an example schematic structural diagram of a human-computer interaction processing system according to some embodiments.

FIG. 2 illustrates an example schematic structural diagram of a human-computer interaction processing system according to some embodiments. As shown in FIG. 2, the system may comprise an interaction transaction apparatus 201 and an interaction engine 202. The interaction engine 202 may be equipped with an interaction control unit 212 and an interaction organizing unit 222. The interaction control unit 212 may be configured to perform control on an interaction flow for a current interaction input according to the interaction task, and the interaction organizing unit 222 may be configured to determine an expected next interaction input in an interaction scenario corresponding to the current interaction input according to the control on the interaction flow. The interaction transaction apparatus 201 may be further configured to describe an interaction task in an interaction scenario according to a hierarchical model. The interaction transaction apparatus 201 may be further configured to create the hierarchical model according to division of interaction sub-tasks of an interaction task and to describe the interaction task in the interaction scenario according to the hierarchical model.

In some embodiments, the interaction transaction apparatus 201 may include, for example, a model creating unit 211 and a describing unit 221, wherein the model creating unit 211 may be configured to create a hierarchical model according to division of interaction sub-tasks of an interaction task, and the describing unit 221 may be configured to describe an interaction task in an interaction scenario according to the hierarchical model. In some embodiments, the hierarchical model may be an interaction task tree, and one subtree of the interaction task tree may correspond to one of the interaction sub-tasks.

In the present embodiment, the interaction control unit 212 may be configured to perform interaction process control on a current interaction input according to context information of the interaction task.

Furthermore, the interaction control unit 212 may be further configured to perform interaction process control on the current interaction input according to the slot information in the context information of the interaction task.

Furthermore, the interaction control unit 212 may be further configured to perform stack-accessing operations on the task execution controls to process the slot information in the context information of the interaction task, so as to perform interaction process control on the current interaction input.

In some embodiments, the interaction control unit 212 may be an interaction execution stack, and when the execution of the current interaction input is completed, the interaction transaction apparatus 201 may be correspondingly configured to execute the task controls in a direction from the stack top to the stack bottom of the interaction execution stack and at the same time, press the triggered task controls into the interaction execution stack from the stack top to the stack bottom.

Furthermore, the interaction control unit 212 may be further configured to perform a stack-accessing operation on task execution controls to process the slot information in the context information of the interaction task, so as to perform interaction process control on the current interaction input.

When the above technical solution of FIG. 2 is applied to a dialogue capable smart device, the human-computer interaction processing system may be implemented through a dialogue management platform or a dialogue manager (DialogManager, DM). The current interaction input is also referred to as a current user input, the interaction transaction apparatus 201 may also be referred to as a dialogue transaction apparatus, and an interaction engine 202 may also be referred to as a dialogue engine. To be adapted to the dialogue transaction apparatus configured to describe dialogue tasks in interaction scenarios according to pre-collected scripts under different dialogue scenarios, the scripts may include pre-collected correspondence relationships between user inputs and possible answers, logic relationships between different user inputs in context information of a dialogue task, and the like. For example, such correspondence relationships and logic relationships may be embodied through a task tree. A dialogue task may be divided into a plurality of dialogue sub-tasks, and each dialogue sub-task may correspond to a subtree of the task tree. A task execution control, such as an agent component (also referred to as an agent), may be configured for each dialogue sub-task. The agent may define a key action to be executed for executing a corresponding dialogue sub-task, such as a response action (responding to the user), initiating an inquiry action to a user (querying the user), initiating an external service call action (calling an external service), and the like, so as to conduct a human-computer dialogue with the user. For example, if the user input is: "I want to send an express mail," then an action to initiate an inquiry to the user may be configured in the corresponding agent, and a sentence of the inquiry action may be generated: "which courier company would you like to use?" As another example, if the user input is: "please check the express delivery No. 123456," then a user-responding action to call an external third-party express delivery inquiry may be configured in the corresponding agent, and a sentence of inquiry response may be generated in the dialogue: "the logistic status of the express delivery No. 123456 is as follows: the seller has shipped the item for transfer in Hangzhou."

The key action defined by a task execution control is merely an example. One of ordinary skill in the art may set up other actions according to needs of specific use scenarios.

In some embodiments, one dialogue task may be divided into a plurality of dialogue sub-tasks, each dialogue sub-task may correspond to a subtree on the dialogue tree, and a task execution control may be configured for each subtree. For example, the dialogue tree may include an express delivery subtree and a weather subtree, and the express delivery subtree may be configured with a user-responding action, a user-querying action, and a third-party application-calling action. The interaction control unit 212 may be configured to perform interaction process control on a current interaction input according to context information of the dialogue task to trigger the above actions on the current interaction input according to changes in the slot information (keywords) in the context information of the interaction task. Moreover, according to the sequence of dialogues, the interaction transaction apparatus 201 may press the agents of the corresponding subtrees into the dialogue execution stack from the stack top to the stack bottom. During the dialogue, according to changes in the slot information, the dialogue task stack may execute a stack exit operation on the corresponding agent, and the interaction organizing unit 222 (e.g., a dialogue agenda) may determine an expected next interaction input in an interaction scenario corresponding to the current interaction input, thereby achieving effective track and management, such as maintaining, switching, and back-tracking, of a dialogue focus in a dialogue, and ultimately achieving interaction process control on the dialogue.

Figure 3:
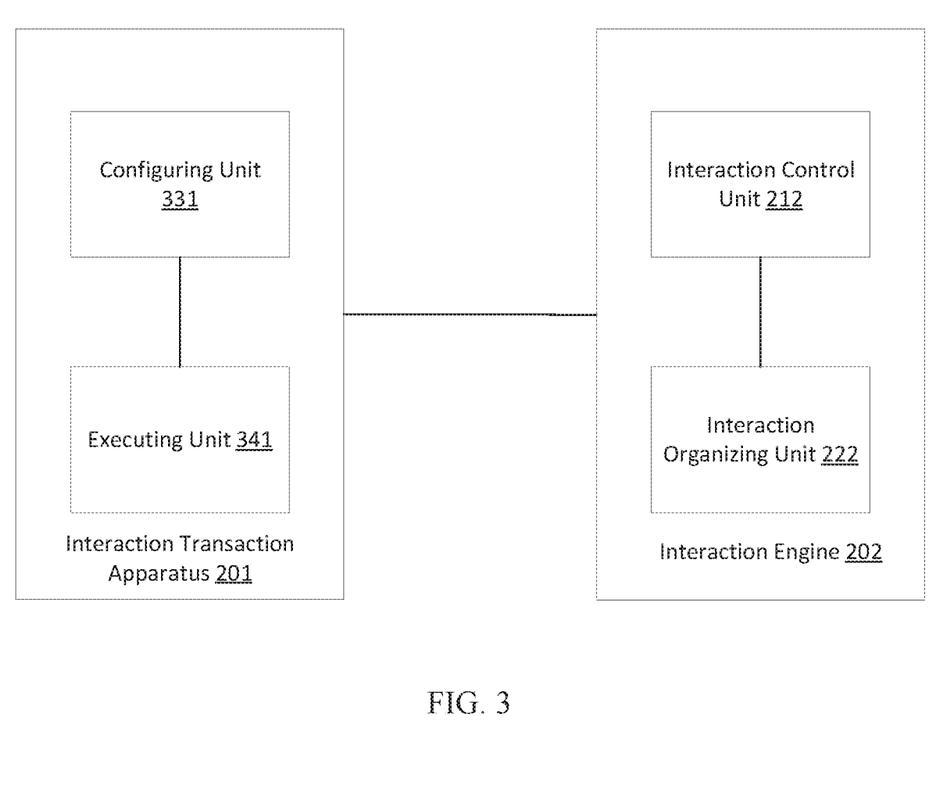
FIG. 3 illustrates an example schematic structural diagram of a human-computer interaction processing system according to some embodiments.

FIG. 3 illustrates an example schematic structural diagram of a human-computer interaction processing system according to some embodiments. As shown in FIG. 3, the system may comprise an interaction transaction apparatus 201 and an interaction engine 202, wherein the interaction transaction apparatus 201 may be further configured to configure task execution controls for nodes of the interaction task tree, so as to execute interaction sub-tasks corresponding to the nodes according to the task execution controls.

In some embodiments, the interaction transaction apparatus 201 may include: a configuring unit 331 and an executing unit 341, wherein the configuring unit 331 may be configured to configure task execution controls for nodes of the interaction task tree, and the executing unit 341 may be configured to execute interaction sub-tasks corresponding to the nodes according to the task execution controls. For example, the task execution controls may define interaction variables corresponding to interaction sub-tasks to be executed thereby, and the interaction variables may be used for controlling execution of the interaction sub-tasks corresponding to the nodes. The interaction variables may be further used for managing corresponding slot information thereof so as to control execution of the interaction sub-tasks corresponding to the nodes.

In some embodiments, the task execution controls may be used for one or a combination of more of initiating a response action to a user, initiating an inquiry action to a user, and initiating an external service call action, so as to execute interaction sub-tasks corresponding to the nodes according to the task execution controls.

In some embodiments, if the task execution control is used for initiating a response action to a user, the interaction transaction apparatus 201 may be further configured to perform structured processing on at least one of the response action and the slot information of the interaction sub-task, so as to execute the interaction sub-task corresponding to the node.

In the present embodiment, if the task execution control is used for initiating an inquiry action to a user, the interaction transaction apparatus 201 may be further configured to trigger the inquiry action when an associated interaction variable is not bundled with the slot information yet, so as to execute the interaction sub-task corresponding to the node, and subsequently switch and transfer the subject of the user's dialogue.

In the present embodiment, if the task execution control is used for initiating an external service call action, the interaction transaction apparatus 201 may be further configured to assign a result from an external service call to a corresponding interaction variable via an input/output protocol.

In the present embodiment, one dialogue variable may be assigned to each piece of the slot information, and the slot information may be managed through the dialogue variables. For example, in the subtree of couriers, it may be defined that a piece of the slot information "courier company" corresponds to a dialogue variable "Company," and this dialogue variable, for example, corresponds to the subtree of "sending express mail." In another example, a piece of the slot information "express delivery number" may correspond to a dialogue variable "Code," and this dialogue variable may correspond to the subtree of "express delivery inquiry." The above dialogue agenda may be constructed according to dialogue variables corresponding to the slot information in the context information of the interaction task, thereby recording all possible user inputs in the current dialogue scenario, which may determine the next dialogue input. Furthermore, when there is a change to an agent in the above dialogue task stack, such as entering the stack or exiting the stack, an exchange variable in the dialogue agenda is updated accordingly to support flexibly switching and backtracking of the dialogue subject.

Figure 4:
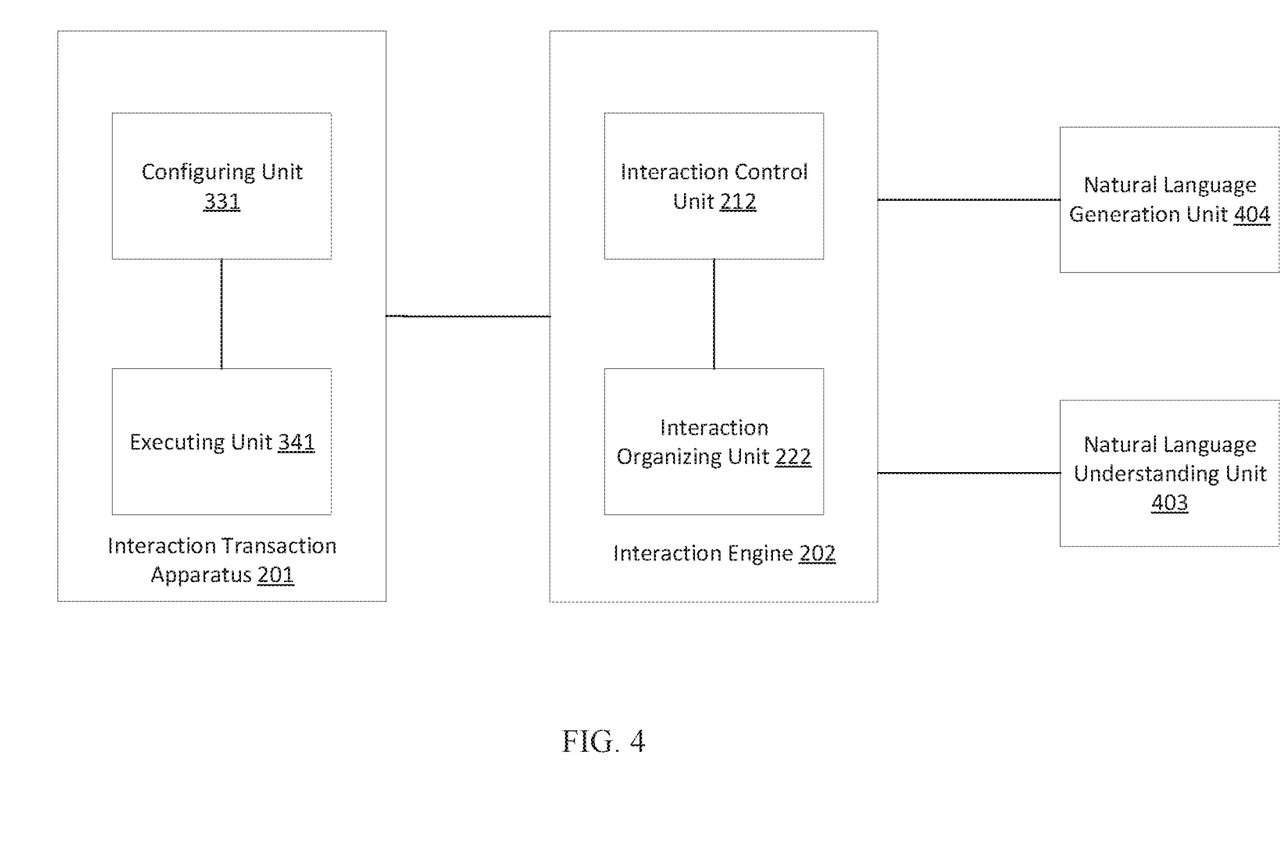
FIG. 4 illustrates an example schematic structural diagram of a human-computer interaction processing system according to some embodiments.

FIG. 4 illustrates an example schematic structural diagram of a human-computer interaction processing system according to some embodiments. As shown in FIG. 4, the system may comprise an interaction transaction apparatus 201 and an interaction engine 202. In some embodiment, the human-computer interaction processing system may further comprise: a natural language understanding unit (NLU) 403 and a natural language generation unit 404. Therefore, in the present embodiment, this human-computer interaction processing system may also be referred to as a human-computer dialogue system when the system is applied in the human-computer dialogue scenario shown in FIG. 2 or FIG. 3. In response to a user input, the human-computer dialogue system may generate an answer corresponding to the user input.

In the present embodiment, the natural language understanding unit 403 may be configured to perform natural language understanding on the current interaction input so as to determine the slot information.

In the present embodiment, the interaction organizing unit 222 may be divided into a plurality of levels according to the nodes of the interaction task tree, and the interaction organizing unit 222 at one level may correspond to one node of the interaction task tree. When the interaction organizing unit 222 is a dialogue agenda, a multi-layer structure may be formed by subtrees in a number of dialogue tasks in a direction from the root node to branch nodes, and each layer corresponds to a node of the subtree. For example, the layer of company in the dialogue agenda corresponds to the node of "express send" subtree in the dialogue task tree.

In the present embodiment, the natural language generation (NLG) unit 404 may be configured to generate a natural language response for the current interaction input.

For example, when the interaction transaction apparatus 201 performs the structured processing, the natural language generation unit 404 may generate natural language according to a result of the structured processing, so as to execute the interaction sub-task corresponding to the node. The structured processing may be, for example, shaping the generated natural language according to speaking habits of a particular language.

For example, when the interaction transaction apparatus 201 triggers the inquiry action, the natural language generation unit 404 may generate natural language according to the triggered inquiry action to initiate an inquiry to the user, so as to execute the interaction sub-task corresponding to the node.

Figure 5:
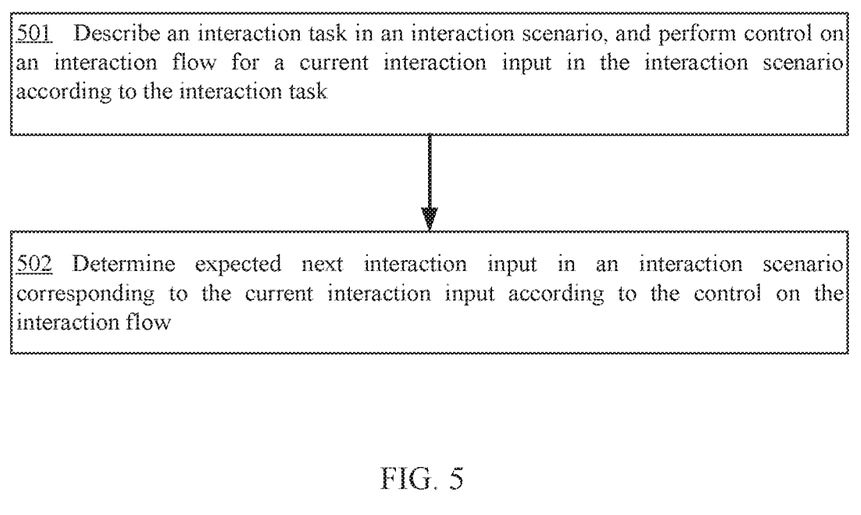
FIG. 5 illustrates an example flow chart of a human-computer interaction processing method according to some embodiments.

FIG. 5 illustrates an example flow chart of a human-computer interaction processing method according to some embodiments. As shown in FIG. 5, the method may comprise:

501. describing an interaction task in an interaction scenario, and performing control on an interaction flow for a current interaction input in the interaction scenario according to the interaction task.

In some embodiments, the interaction task may be described according to a pre-collected script.

502. determining an expected next interaction input in the interaction scenario corresponding to the current interaction input based on the interaction process control.

The embodiments of FIG. 2 through FIG. 4 may be referenced for exemplary description of the steps 501 and 502.

Some embodiments of the specification further provide a storage medium, wherein the storage medium stores computer executable instructions, and when executed by one or more processors, the computer executable instructions implement the method according to any one of the above embodiments.

Some embodiments of the specification further provide an electronic device, comprising one or more processors and a storage medium, wherein the storage medium stores computer executable instructions, and when executed by the one or more processors, the computer executable instructions implement the method according to any one of the above embodiments. In some embodiments, the electronic device may be either a mobile terminal or a server.

In the above embodiments of the specification, as interaction tasks in different application scenarios may be described through the interaction transaction apparatus, complex dialogue flows may be customized. Furthermore, the interaction control unit may perform control on an interaction flow for a current interaction input according to the interaction task, so that the control of dialogue flows may become more flexible and satisfy various dialogue scenario demands. Moreover, the interaction organizing unit may determine an expected next interaction input in an interaction scenario corresponding to the current interaction input according to the control on the interaction flow, thereby allowing the user to flexibly switch topics.

The apparatus embodiments described above are merely illustrative, wherein the modules described as separate components may or may not be physically separated, and the components shown as the modules may or may not be physical modules, i.e., they may be located in one place or may be distributed to a plurality of network modules. Part or all of the modules may be selected according to actual needs to achieve the objectives of the solutions of the embodiments. One of ordinary skill in the art can understand and implement without any inventive effort.

With the above description of the implementation manners, those skilled in the art may understand that all the implementation manners may be achieved through software plus a necessary general hardware platform or may be achieved through hardware. Based on such understanding, the above technical solutions, in essence, or the portion thereof that contributes to the current technologies, may be embodied in the form of a software product. The computer software product may be stored in a computer readable storage medium. The computer readable storage medium includes any mechanism that stores or transfers information in the computer (e.g., a computer) readable form. For example, the machine-readable medium includes a Read-Only Memory (ROM), a Random-Access Memory (RAM), a magnetic disk storage medium, an optical storage medium, a flash storage medium, a propagating signal in the form of electricity, light, sound, or other forms (e.g., a carrier, an infrared signal, a digital signal, etc.). The computer software product includes several instructions to cause a computer device (which may be a personal computer, a server, or a network device) to execute methods according to the embodiments or some parts of the embodiments.

Finally, it should be noted that the above embodiments are merely used to describe, rather than limit, the technical solutions of the embodiments of the specification. Although the specification is described in detail with reference to the above embodiments, one of ordinary skill in the art should understand that the technical solutions in the above-described embodiments may still be amended or some technical features thereof may be equivalently substituted, while these amendments or substitutions do not cause the essence of corresponding technical solutions to depart from the spirit and scope of the technical solutions in the embodiments of the specification One of ordinary skill in the art should understand that the embodiments of the specification may be provided as a method, an apparatus (device), or a computer program product. Therefore, the embodiments of the specification may be in the form of a complete hardware embodiment, a complete software embodiment, or an embodiment combining software and hardware. Moreover, the embodiments of the specification may be in the form of a computer program product implemented on one or more computer usable storage media (including, but not limited to, a magnetic disk memory, CD-ROM, an optical memory, etc.) comprising computer usable program codes.

The embodiments of the specification are described with reference to flowcharts and/or block diagrams of the method, apparatus (device), and computer program product according to the embodiments of the specification. In some embodiments, computer program instructions may be used to implement each process and/or block in the flowcharts and/or block diagrams and a combination of processes and/or blocks in the flowcharts and/or block diagrams. The computer program instructions may be provided for a general-purpose computer, a special-purpose computer, one or more embedded processors, or one or more processors of other programmable data processing devices to generate a machine, causing the instructions executed by a computer or one or more processors of other programmable data processing devices to generate an apparatus for implementing a function specified in one or more processes in the flowcharts and/or in one or more blocks in the block diagrams.

The computer program instructions may also be stored in a computer readable memory that instruct a computer or other programmable data processing devices to work in a particular manner, causing the instructions stored in the computer readable memory to generate a manufactured article that includes an instruction apparatus. The instruction apparatus may implement a function specified in one or more processes in the flowcharts and/or in one or more blocks in the block diagrams.

The computer program instructions may also be loaded onto a computer or other programmable data processing devices, causing a series of operational steps to be executed on the computer or other programmable devices, thereby generating computer-implemented processing. Therefore, the instructions executed on the computer or other programmable devices may provide steps for implementing a function specified in one or more processes in the flowcharts and/or in one or more blocks in the block diagrams.

What is claimed is:

1. A method for processing human-computer interaction, comprising:
    obtaining a tree model representing a plurality of pre-collected scripts under a plurality of dialogue scenarios, wherein the plurality of pre-collected scripts comprise correspondence relationships between user inputs and answers;
    describing an interaction task in an interaction scenario as an interaction task tree according to the tree model, wherein the interaction task tree comprises sub-trees corresponding to interaction sub-tasks of the interaction task, and each of the sub-trees is mapped to an action for responding to a corresponding interaction sub-task;
    performing interaction process control for a current interaction input in the interaction scenario based on the interaction task, wherein the interaction process control comprises:
        determining one of the sub-trees in the interaction task tree according to the current interaction input, and
        pressing one or more actions corresponding to the one sub-tree into a stack, wherein the one or more actions comprise at least one of following: responding to a user, querying the user, and calling an external service;
    building a task execution control item to execute an interaction sub-task corresponding to the one sub-tree of the interaction task tree, wherein the task execution control item defines an interaction variable corresponding to the interaction sub-task;
    executing the one or more actions in the stack based on the task execution control item, wherein the execution comprises:

in response to the one or more actions comprising calling an external service, triggering an external service request; and bounding a result of the external service request to the interaction variable; and determining an expected next interaction input in the interaction scenario corresponding to the current interaction input based on the execution of the one or more actions in the stack.

2. The method of claim 1, further comprising:
generating a natural language response to the current interaction input.

3. The method of claim 1, the building of the task execution control item corresponding to the one sub-tree of the interaction task tree further comprising:
building a task execution control item for a node of the interaction task tree to execute an interaction sub-task corresponding to the node.

4. The method of claim 1, wherein the interaction variable controls execution of the interaction sub-task corresponding to the node.

5. The method of claim 4, wherein the interaction variable manages slot information corresponding to the interaction sub-task to be executed for controlling the execution of the interaction sub-task corresponding to the node.

6. The method of claim 5, further comprising:
determining the slot information by parsing the current interaction input.

7. The method of claim 5, wherein in response to one of the one or more actions comprising responding to the user, the method further comprises:
performing a structured process based on the expected next interaction input and at least one of the slot information of an interaction sub-task, to execute the interaction sub-task corresponding to the node.

8. The method of claim 5, wherein in response to one of the one or more actions comprising querying the user, the method further comprises:
triggering a query when the interaction variable is not bound to the slot information, to execute the interaction sub-task corresponding to the node.

9. The method of claim 3, further comprising:
performing a stack operation on the task execution control item to process slot information in the context information of the interaction task, to perform the interaction process control on the current interaction input.

10. The method of claim 1, wherein performing the interaction process control for the current interaction input in the interaction scenario based on the interaction task comprises:
performing the interaction process control for the current interaction input in the interaction scenario based on context information of the interaction task.

11. A system for processing human-computer interaction, comprising one or more processors and one or more non-transitory computer-readable storage media storing instructions executable by the one or more processors to cause the system to perform operations comprising:
obtaining a tree model representing a plurality of pre-collected scripts under a plurality of dialogue scenarios, wherein the plurality of pre-collected scripts comprise correspondence relationships between user inputs and answers;
describing an interaction task in an interaction scenario as an interaction task tree according to the tree model, wherein the interaction task tree comprises sub-trees corresponding to interaction sub-tasks of the interaction task, and each of the sub-trees is mapped to an action for responding to a corresponding interaction sub-task;
performing interaction process control for a current interaction input in the interaction scenario based on the interaction task, wherein the interaction process control comprises:
determining one of the sub-trees in the interaction task tree according to the current interaction input, and
pressing one or more actions corresponding to the one sub-tree into a stack, wherein the one or more actions comprise at least one of following: responding to a user, querying the user, and calling an external service;
building a task execution control item to execute an interaction sub-task corresponding to the one sub-tree of the interaction task tree, wherein the task execution control item defines an interaction variable corresponding to the interaction sub-task;
executing the one or more actions in the stack based on the task execution control item, wherein the execution comprises:
in response to the one or more actions comprising calling an external service, triggering an external service request; and
bounding a result of the external service request to the interaction variable; and
determining an expected next interaction input in the interaction scenario corresponding to the current interaction input based on the execution of the one or more actions in the stack.

12. The system of claim 11, wherein the interaction variable manages slot information corresponding to the interaction sub-task to be executed.

13. The system of claim 12, wherein the interaction variable manages the slot information corresponding to the interaction sub-task to be executed for controlling execution of the interaction sub-task corresponding to an node in the interaction task tree.

14. The system of claim 13, wherein the operations further comprise:
determining the slot information by parsing the current interaction input.

15. The system of claim 12, wherein in response to one of the one or more actions comprising responding to the user, the operations further comprise:
performing a structured process based on the expected next interaction input and at least one of the slot information of the interaction sub-task, to execute the interaction sub-task corresponding to an node in the interaction task tree.

16. The system of claim 12, wherein in response to one of the one or more actions comprising querying the user, the operations further comprise:
triggering a query when the interaction variable is not bound to the corresponding slot information, to execute the interaction sub-task corresponding to an node in the interaction task tree.

17. The system of claim 11, wherein the operations further comprise:
generating a natural language response to the current interaction input.

18. A non-transitory computer-readable storage medium for processing human-computer interaction, configured with instructions executable by one or more processors to cause the one or more processors to perform operations comprising:

obtaining a tree model representing a plurality of pre-collected scripts under a plurality of dialogue scenarios, wherein the plurality of pre-collected scripts comprise correspondence relationships between user inputs and answers;

describing an interaction task in an interaction scenario as an interaction task tree according to the tree model, wherein the interaction task tree comprises sub-trees corresponding to interaction sub-tasks of the interaction task, and each of the sub-trees is mapped to an action for responding to a corresponding interaction sub-task;

performing interaction process control for a current interaction input in the interaction scenario based on the interaction task, wherein the interaction process control comprises:

determining one of the sub-trees in the interaction task tree according to the current interaction input, and     pressing one or more actions corresponding to the one sub-tree into a stack, wherein the one or more actions comprise at least one of following: responding to a user, querying the user, and calling an external service;

building a task execution control item to execute an interaction sub-task corresponding to the one sub-tree of the interaction task tree, wherein the task execution control item defines an interaction variable corresponding to the interaction sub-task;

executing the one or more actions in the stack based on the task execution control item, wherein the execution comprises:

in response to the one or more actions comprising calling an external service, triggering an external service request; and     bounding a result of the external service request to the interaction variable; and determining an expected next interaction input in the interaction scenario corresponding to the current interaction input based on the execution of the one or more actions in the stack.

19. The non-transitory computer-readable storage medium of claim 18, wherein the operations further comprise:

generating a natural language response to the current interaction input.

20. The non-transitory computer-readable storage medium of claim 18, wherein in response to one of the one or more actions comprising responding to the user, the operations further comprise:

performing a structured process based on the expected next interaction input and at least one of the slot information of the interaction sub-task, to execute the interaction sub-task corresponding to an node in the interaction task tree.

21. The non-transitory computer-readable storage medium of claim 18, wherein in response to one of the one or more actions comprising querying the user, the operations further comprise:

triggering a query when the interaction variable is not bound to the corresponding slot information, to execute the interaction sub-task corresponding to an node in the interaction task tree.

\* \* \* \* \*